US008275951B2

(12) United States Patent
Andruszkiewicz et al.

(10) Patent No.: US 8,275,951 B2
(45) Date of Patent: Sep. 25, 2012

(54) LOCAL BITMAPS FOR AN ARRAY OF REDUNDANT STORAGE DEVICES

(75) Inventors: John J. Andruszkiewicz, Hollis, NH (US); Robert A. Brooks, Leverett, MA (US); Andrew C. Goldstein, Hudson, MA (US); Leonard S. Szubowicz, Merrimack, NH (US); James J. Friedrichs, Hewitt, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1430 days.

(21) Appl. No.: 10/865,539

(22) Filed: Jun. 10, 2004

(65) Prior Publication Data

US 2005/0278483 A1 Dec. 15, 2005

(51) Int. Cl.
*G06F 12/00* (2006.01)
(52) U.S. Cl. ........ 711/154; 711/114; 711/156; 711/165; 711/170
(58) Field of Classification Search ................... 711/114, 711/154, 156, 165, 170
See application file for complete search history.

(56) References Cited

U.S. PATENT DOCUMENTS

| | | | | |
|---|---|---|---|---|
| 5,537,567 A | * | 7/1996 | Galbraith et al. | 711/114 |
| 5,574,882 A | * | 11/1996 | Menon et al. | 711/114 |
| 5,613,085 A | * | 3/1997 | Lee et al. | 711/114 |
| 5,948,110 A | * | 9/1999 | Hitz et al. | 714/6 |
| 5,951,695 A | * | 9/1999 | Kolovson | 714/16 |
| 6,035,412 A | * | 3/2000 | Tamer et al. | 714/6 |
| 6,088,769 A | * | 7/2000 | Luick et al. | 711/141 |
| 6,189,016 B1 | * | 2/2001 | Cabrera et al. | 707/203 |
| 6,347,335 B1 | * | 2/2002 | Shagam et al. | 709/223 |
| 6,446,220 B1 | * | 9/2002 | Menon | 714/5 |
| 6,665,780 B1 | | 12/2003 | Bradley | |
| 6,799,284 B1 | * | 9/2004 | Patel et al. | 714/6 |
| 6,851,022 B2 | * | 2/2005 | Ikeuchi et al. | 711/114 |
| 6,993,676 B2 | * | 1/2006 | Corbin et al. | 714/5 |
| 7,433,898 B1 | * | 10/2008 | Georgiev | 707/202 |
| 2004/0030703 A1 | * | 2/2004 | Bourbonnais et al. | 707/100 |
| 2005/0071708 A1 | * | 3/2005 | Bartfai et al. | 714/5 |

OTHER PUBLICATIONS

Hennessy, John L., Patterson, David A., "Computer Organization and Design, The Hardware/Software Interface", 1998, Morgan Kaufmann Publishers, Inc., Second Edition, pp. 563.*
E. K. Lee and C. A. Thekkath, "Petal: Distributed Virtual Disks", ACM SIGPLAN Notices, vol. 31, Issue 9 Sep. 1996.*
"Storage Foundation Cluster File System", VERITAS Software Corporation, 2003, <www.repton.co.uk/library/symantec_storage_foundation_cluster_file_system.pdf>.*
C. A. Thekkath, T. Mann, and E. K. Lee, "Frangipani: A Scalable Distributed File System", in Proceedings of the 16th ACM Symposium on Operating Systems Principles, Oct. 1997.*
F. Schmuck and R. Haskin, "GPFS: A Shared-Disk File System for Large Computing Clusters", In Proceedings of the First Conference on File and Storage Technologies (FAST), Jan. 2002.*

* cited by examiner

*Primary Examiner* — Arpan P. Savla (57) ABSTRACT

In accordance with at least some embodiments of the invention, a system comprises a plurality of computers coupled together and to an array of redundant storage devices that is accessible to the plurality of computers. Each of the plurality of computers comprises a local memory that stores at least one bitmap. The least one bitmap logs regions of the redundant array that have been modified.

21 Claims, 8 Drawing Sheets

| | BITMAP POLICY | |
|---|---|---|
| 602 { | 2 | HOSTS=COMPUTER1, COMPUTER2, COMPUTER3, COMPUTER4 |
| 604 { | 1 | HOSTS=COMPUTER5, COMPUTER6 |
| 606 { | 3 | HOSTS=COMPUTER7, COMPUTER8, COMPUTER9 |
| 608 { | 50,000 | RESET_THRESHOLD |

LOCAL BITMAPS FOR AN ARRAY OF REDUNDANT STORAGE DEVICES

BACKGROUND

Some computer systems store data in an array of redundant storage devices. Since the contents of each storage device in the array are identical, the storage devices may be referred to as "shadow" or "mirror" devices. When a fault occurs that disables one of the mirror devices, the contents of the array may be accessed through another mirror device. As such, the array is designed to increase fault tolerance of the computer system.

When the computer system writes data to the array, a write command is issued to each storage device in the array. If the computer system crashes while issuing the write commands, the data in the storage devices in the array may become inconsistent. To resolve the inconsistency, the contents of storage devices may be compared and, if necessary, merged. In most cases, merging the contents of the storage devices is a time-consuming and bandwidth-intensive process, involving the reading and writing of the entire contents of each storage device.

Bitmaps may be used to increase the performance of the merge process. Bitmaps are logs that mark regions of the array of redundant storage devices as "dirty." A dirty region represents a portion of the array that has been modified by the computer system. Thus, bitmaps mark the regions of the array that may be inconsistent after a system crash. When performing a merge, only the regions identified as dirty by the bitmaps may be included in the merge process. Since the regions marked as dirty may be a subset of the array, the efficiency of the merge process is increased.

Bitmaps may be stored and maintained in any non-volatile storage device, such as the array of redundant storage devices. Unfortunately, maintaining such bitmaps to record the dirty regions of the array may require a substantial number of input/output (I/O) operations, thereby decreasing the performance of the computer system.

BRIEF SUMMARY

In accordance with at least some embodiments, a system comprises a plurality of computers coupled together and to an array of redundant storage devices that is accessible to the plurality of computers. Each of the plurality of computers comprises a local memory that stores at least one bitmap. The least one bitmap logs regions of the redundant array that have been modified.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

The term "local memory" refers to any type of volatile memory, such as random access memory (RAM), synchronous dynamic random access memory (SDRAM), and/or rambus dynamic random access memory (RDRAM), that is directly attached to a computer system through a memory subsystem.

DETAILED DESCRIPTION

Figure 1:
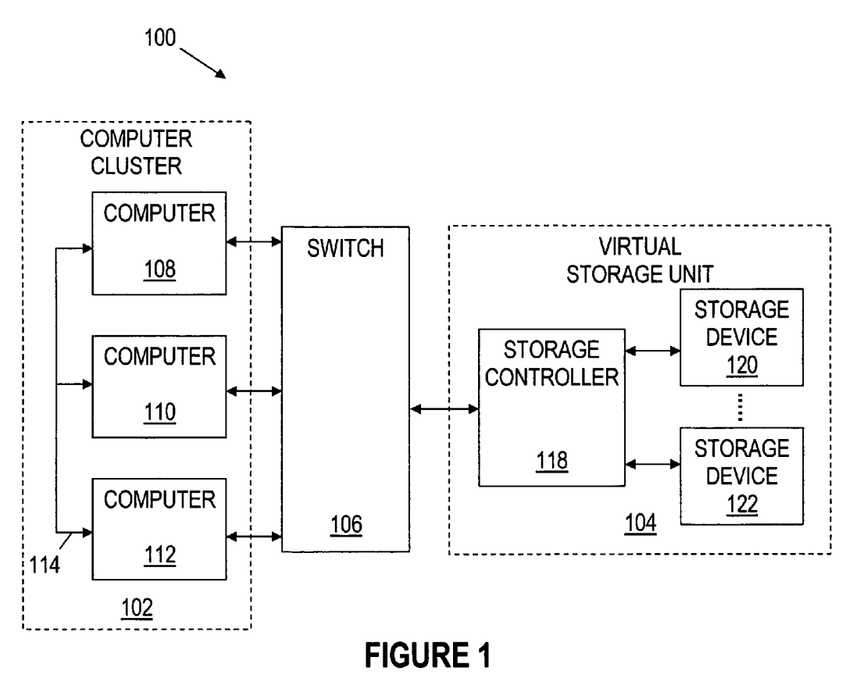
FIG. 1 shows a system configured in accordance with embodiments of the invention.

FIG. 1 shows a system 100 configured in accordance with at least some of the embodiments of the invention. As shown, the system 100 comprises a computer cluster 102 coupled to a virtual storage unit 104 through a switch 106. The computer cluster 102 comprises a plurality of computers 108, 110, and 112 coupled together through communications link 114. The communication link 114 utilizes a communications protocol, such as Ethernet, Fast Ethernet, and/or Gigabit Ethernet, or other communications protocol now know or later developed, to send and receive data and commands between the computers 108, 110, and 112.

The computer cluster 102 access the virtual storage unit 104 through the switch 106. The virtual storage unit 104 comprises a storage controller 118 coupled to a plurality of storage devices 120 and 122. The storage devices 120 and 122 may comprise any type of storage device, such as a Small Computer System Interface (SCSI) storage device and/or a Fibre Channel (FC) storage device. The storage devices 120 and 122 are configured to operate as a redundant array, such as a Redundant Array of Inexpensive Disks (RAID) operating at level 1. As such, the storage devices 120 and 122 may be referred to as "shadow" or "mirror" devices. When a computer 108, 110, or, 112 writes data to the virtual storage unit 104, a write command is issued to each storage device 120 and 122. When a computer 108, 110, or, 112 reads data from the virtual storage unit 104, a read command is issued to a select one of the storage devices 120 and 122. By reading data from and writing data to the virtual storage unit 104 in the preceding fashion, the data stored on the storage devices 120 and 122 may remain consistent.

Figure 2:
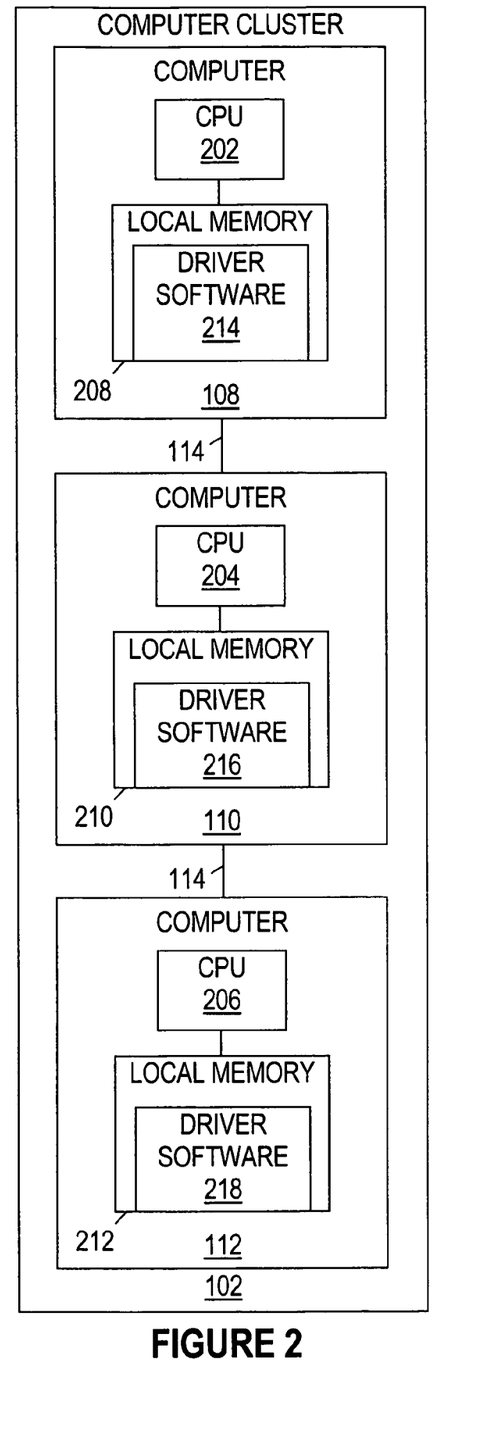
FIG. 2 shows a computer cluster configured in accordance with embodiments of the invention.

FIG. 2 shows a configuration of the computer cluster 102 in accordance with at least some embodiments of the invention. Each computer 108, 110, and 112 comprises a central processing unit (CPU) and a local memory. Thus, computer 108 comprises a CPU 202 and a local memory 208, while computers 110 and 112 comprise CPUs 204 and 206 and local memory 210 and 212, respectively. The local memories 208, 210, and 212 may comprise any suitable type of volatile memory, such as random access memory (RAM), synchronous dynamic random access memory (SDRAM), and/or rambus dynamic random access memory (RDRAM). Stored within each local memory 208, 210, and 212 is driver software 214, 216, and 218, respectively. The driver software 214, 216, and 218 is configured to manage the interaction between the computer cluster 102 and the virtual storage unit 104 (FIG. 1).

The driver software 214, 216, and 218 comprises executable code developed in any suitable programming language, such as C, C++, and/or assembly. When a computer 108, 110, or 112 desires to write data to the virtual storage unit 104 (FIG. 1), the respective driver software 214, 216, or, 218 issues a write command to each storage device 120 and 122 When a computer 108, 110, or 112 desires to read data from the virtual storage unit 104, the respective driver software 214, 216, or 218 issues a read command to a select one of the storage devices 120 and 122. Thus, the driver software facilitates the low-level interaction between the computer cluster 102 and the virtual storage unit 104.

In at least some embodiments of the invention, the driver software 214, 216, and 218 comprise volume management software that is integrated with an operating system (OS). Although shown in FIG. 2 as being stored in the local memories 208, 210, and 212, the driver software may alternatively reside in one or more storage controllers accessible to the computer cluster 102.

Figure 3:
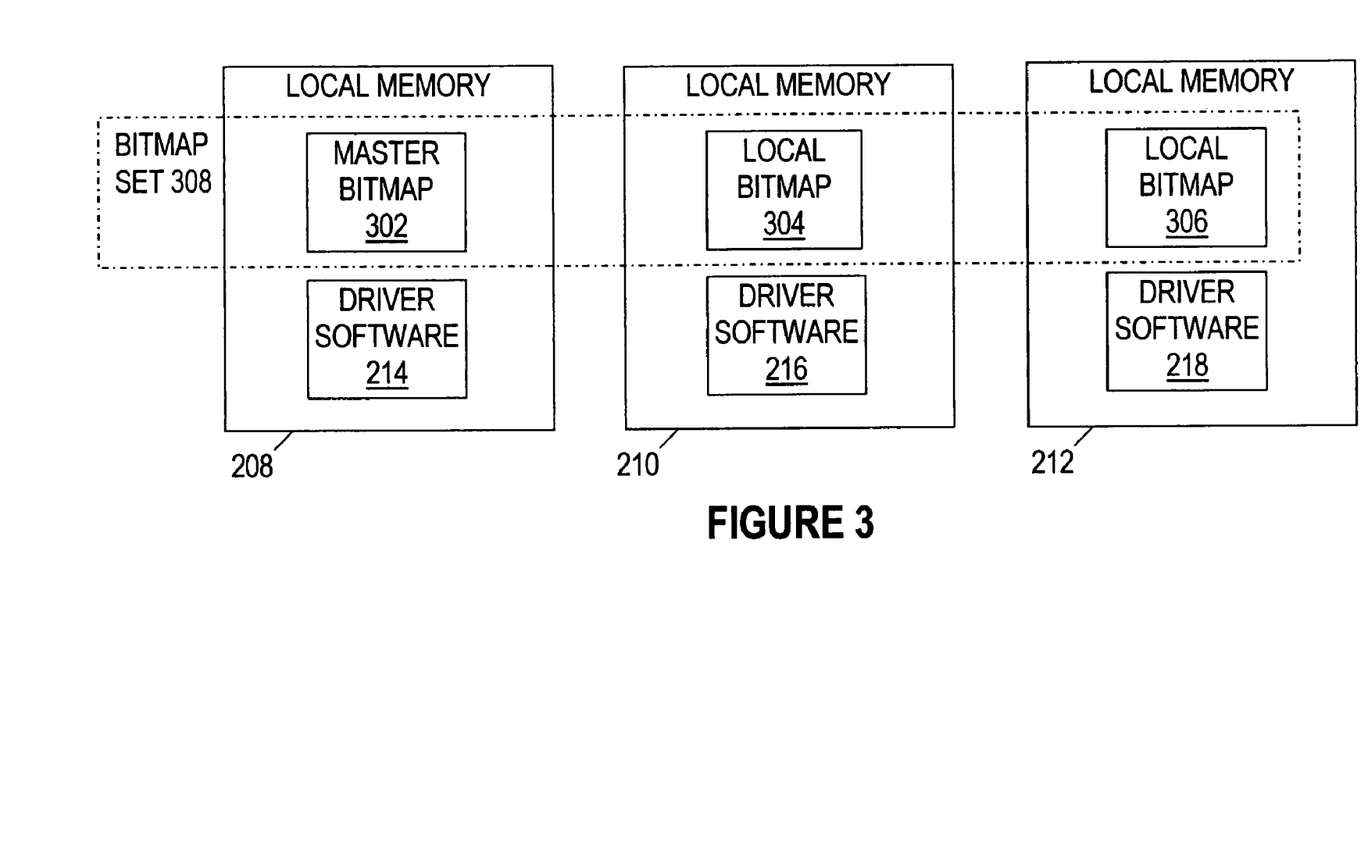
FIG. 3 shows at least some of the contents of the memory associated with a computer cluster in accordance with embodiments of the inventions.

FIG. 3 shows at least some of the contents of the local memories 208, 210, and 212 in accordance with at least some embodiments of the invention. After the computers 108, 110, and 112 initialize, or "mount," the virtual storage unit 104, the local memory 208 comprises the driver software 214 and a master bitmap 302. The local memory 210 comprises the driver software 216 and a local bitmap 304. Similarly, the local memory 212 comprises the driver software 218 and a local bitmap 306. The master bitmap 302 and the local bitmaps 304 and 306 represent a bitmap set 308. A bitmap set comprises one master bitmap and one or more local bitmaps. Each computer system that mounts the virtual storage unit 104 stores, or "hosts," a bitmap from the bitmap set in the computer's local memory. If the computer hosting the master bitmap 304 (i.e., computer 108) crashes, the entire bitmap set 308 is deleted from the computer cluster. As will be discussed, the bitmap set is used to enhance the merging of storage devices in a virtual storage unit.

In some embodiments, the master bitmap 302 comprises a binary file that functions as a master log. The master log identifies regions of the virtual storage unit 104 that have been modified by the computers in the computer cluster 102 that have mounted the virtual storage unit 104 (i.e., computers 108, 110, and 112). The local bitmaps 304 and 306 comprise binary files that function as local logs. The local logs identify regions of the virtual storage unit 104 that have been modified by the particular computer that hosts the local log. For example, local bitmap 306 comprises a local log that reflects the modifications made to the virtual storage unit 104 by the computer 102.

Since the master bitmap 302 comprises a master log that represents a complete recording of modifications to the virtual storage unit 104 by every computer in the cluster 102, the master bitmap 302 is examined before performing a merge on the contents of the storage devices 120 and 122. As previously discussed, a merge may be initiated in response to a particular system event, such as a system crash, to restore consistency between the storage devices of a virtual storage unit. By examining the master bitmap 302, only regions of the virtual storage unit 104 that have been modified by the computers 108, 110, and 112 may be included in a merge of the storage devices 120 and 122. As such, only a portion of the contents of the storage devices 120 and 122 need to be compared and, if necessary, merged.

Although only a single bitmap set is shown in FIG. 3, at least some embodiments of the invention utilize a plurality of bitmap sets, resulting in multiple master bitmaps stored in distinct local memory units. By utilizing multiple bitmap sets, fault tolerance is increased. For example, if a computer that stores a master bitmap crashes, another computer that hosts a master bitmap may be available to perform the merge. If a computer crashes while performing a merge, another computer hosting a master bitmap continues or restarts the merge. An exemplary configuration with multiple bitmap sets is discussed after the following discussion of FIG. 4.

Figure 4:
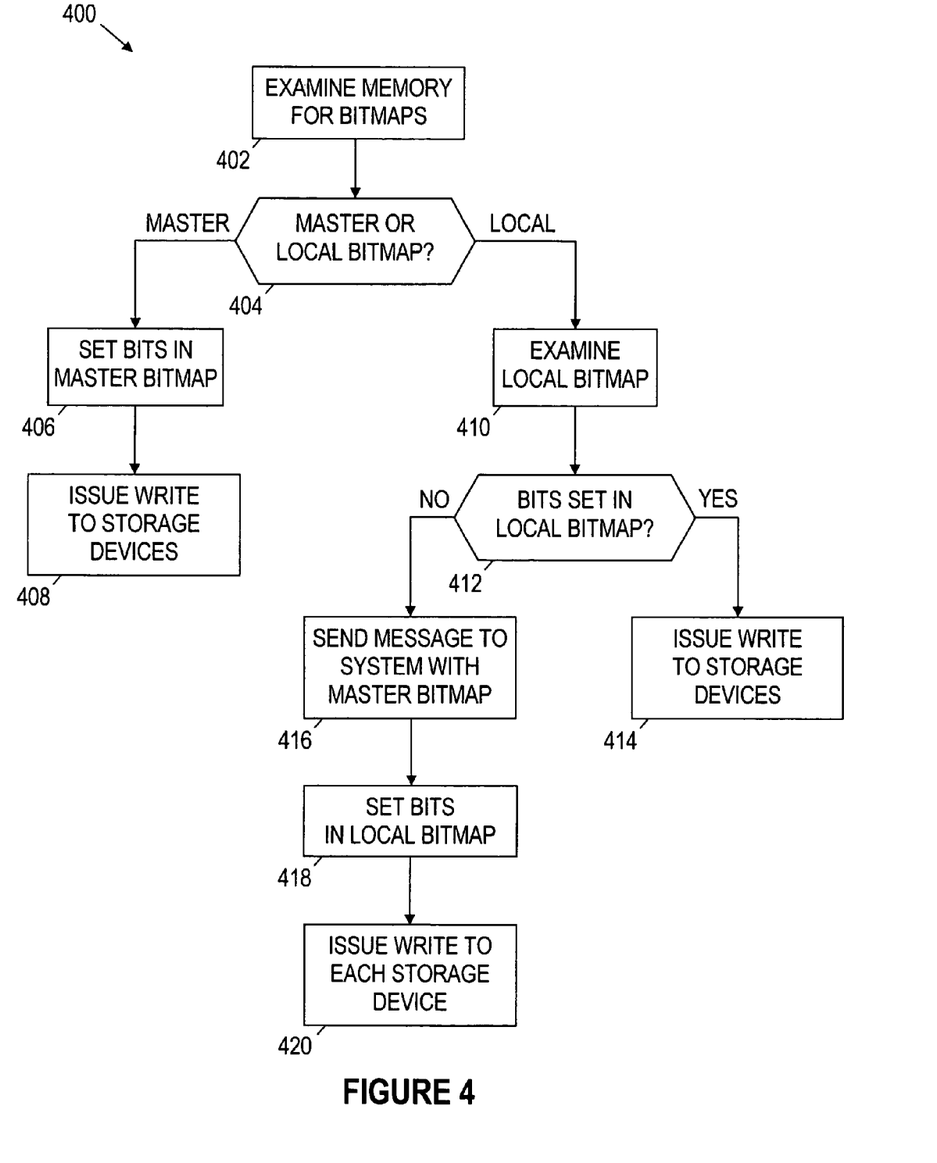
FIG. 4 shows a procedure performed by a computer cluster to record write operations in at least one bitmap in accordance with embodiments of the inventions.

FIG. 4 illustrates a procedure 400 performed by a computer cluster when writing to a virtual storage unit in accordance with at least some embodiments of the invention. Before performing a write operation, a computer system examines its local memory for the presence of bitmaps (block 402). If a master bitmap is found for the virtual storage unit (block 404), one or more bits of the master bitmap are set (block 406). The bits set in the master bitmap correspond to the regions of the virtual storage unit that are to be modified by the write operation. After setting the corresponding bits, one or more write commands are issued to the virtual storage unit (block 408). As previously discussed, the driver software may determine the number of write commands to issue depending upon the number of storage devices contained in the virtual storage unit.

If a local copy of the bitmap is found (block 404), the local bitmap is examined (block 410) to determine if the one or more bits corresponding to the region of the write operation are set (block 412). If the corresponding bits in the local bitmap are set, one or more write commands are issued to the virtual storage unit (block 414). If the corresponding bits in the local bitmap are not set (block 412), a message is sent to the computer system that stores a master bitmap and the bits corresponding to the region of the write operation are set in the master bitmap (block 416). After successfully transmitting the message, and optionally receiving an acknowledgement, the bits corresponding to the region of the write operation are set in the local copy (block 418). The computer that stores the master bitmap sets the appropriate bits in the master bitmap in response to receiving the message. The computer system performing the write operation sets the corresponding bits in the local bitmap. After the bits in the local and master bitmaps are set, write commands are issued to the storage devices of the virtual storage unit (block 420).

The procedure 400 ensures that a master bitmap reflects the modifications made to a virtual storage unit by every computer in the cluster. Thus, a merge may be performed on the virtual storage unit using the master log in the master bitmap to identify regions of a virtual storage unit that have been modified. By first examining the local bitmaps, the number of messages sent to the computer system that stores the master bitmap may be reduced. Thus, the procedure 400 is designed to minimize the number of messages exchanged between the computers of the cluster, while ensuring that a master bitmap reflects the modifications made by all computers in a cluster. The creation and deletion of the bitmaps, as well as the exchange of messages between the systems of the computer cluster, may be facilitated by cluster utilities, such as lock managers and messaging services.

Although the procedure 400 assumes only a single bitmap set, in at least some embodiments of the invention multiple bitmap sets are used. In these embodiments, multiple local bitmaps are examined and messages sent to each computer system storing a master bitmap. In addition, some aspects of the procedure 400 may be modified as desired. For example, instead of setting the appropriate bits in the master bitmap (block 406), the procedure may first examine the master bitmap to determine if the corresponding bits have already been set. If the bits are set, one or more write commands may be directly issued to the virtual storage unit (block 408) without setting the bits.

Figure 5:
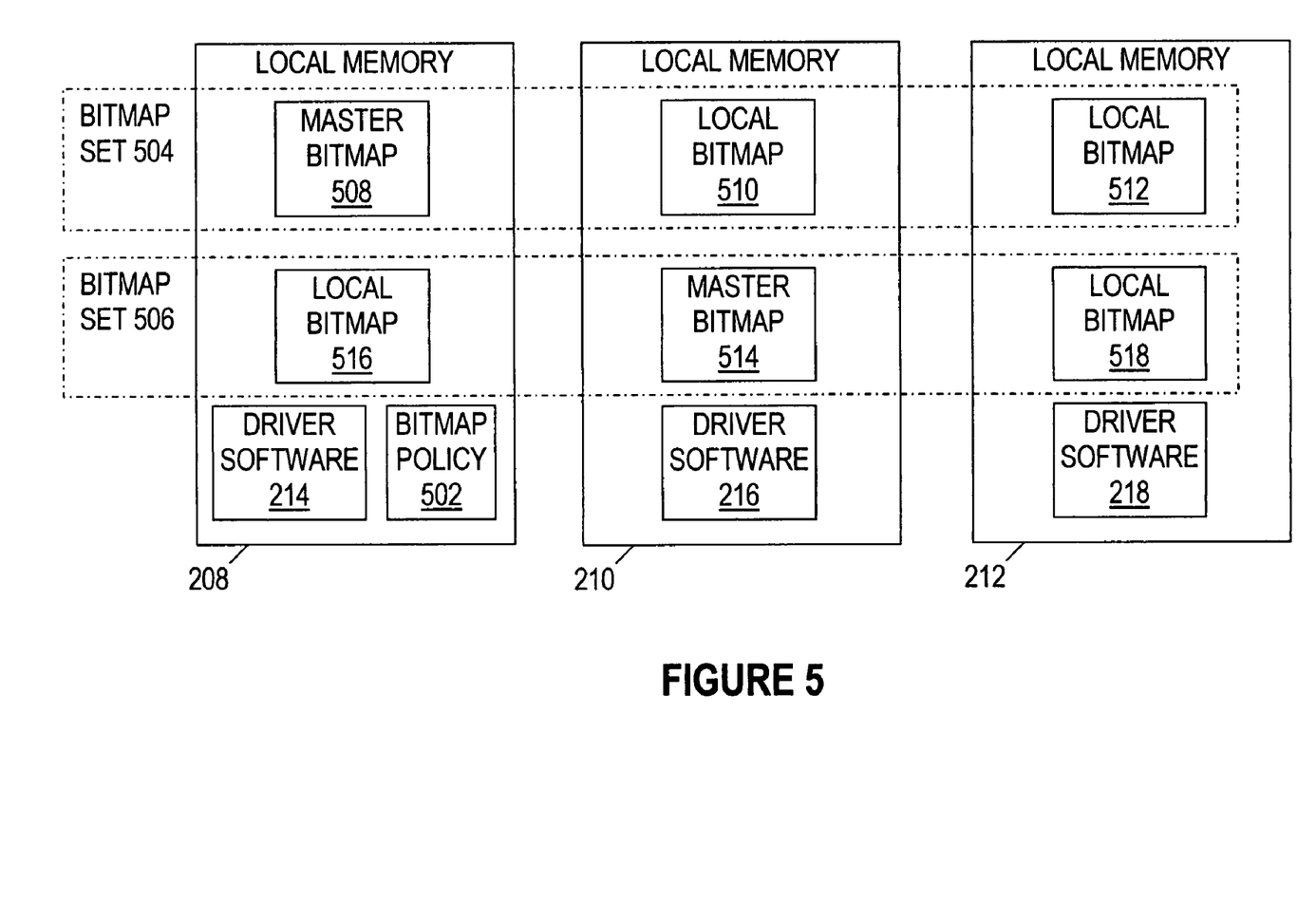
FIG. 5 shows at least some of the contents of the memory associated with a computer cluster in accordance with alternative embodiments of the invention.

FIG. 5 shows at least some of the contents of the memories 208-212 in accordance with alternative embodiments of the invention. In these alternative embodiments, a bitmap policy 502 is used to configure the number of bitmap sets and define the one or more systems that host a master bitmap. As previously discussed, each computer that mounts the virtual storage unit 104 stores either a master or local bitmap from each bitmap set in the computer's local memory. Although shown as residing in the local memory 208, the bitmap policy 502 may reside in any one or more storage locations associated with the cluster 102. For example, the bitmap policy 502 may be defined as a logical resource of the cluster, residing in any one or more storage devices coupled to the cluster. The storage devices may be accessible to the computers in the cluster either directly of indirectly through other systems and/or components.

The configuration of FIG. 5 illustrates two bitmaps sets 504 and 506. Bitmap set 504 comprises a master bitmap 508, a local bitmap 510, and a local bitmap 512. Bitmap set 506 comprises a master bitmap 514, a local bitmap 516, and a local bitmap 518. Both master bitmaps 508 and 514 contains a master log of modifications made to the virtual storage unit 104. As such, either master bitmap 508 or 514 may be used to perform a merge of the storage devices 120 and 122. Since each bitmap set 504 and 506 is associated with the virtual storage unit 104, the master bitmaps 508 and 514 reside in distinct local memory units 208 and 210 to increase fault tolerance.

Figure 6:
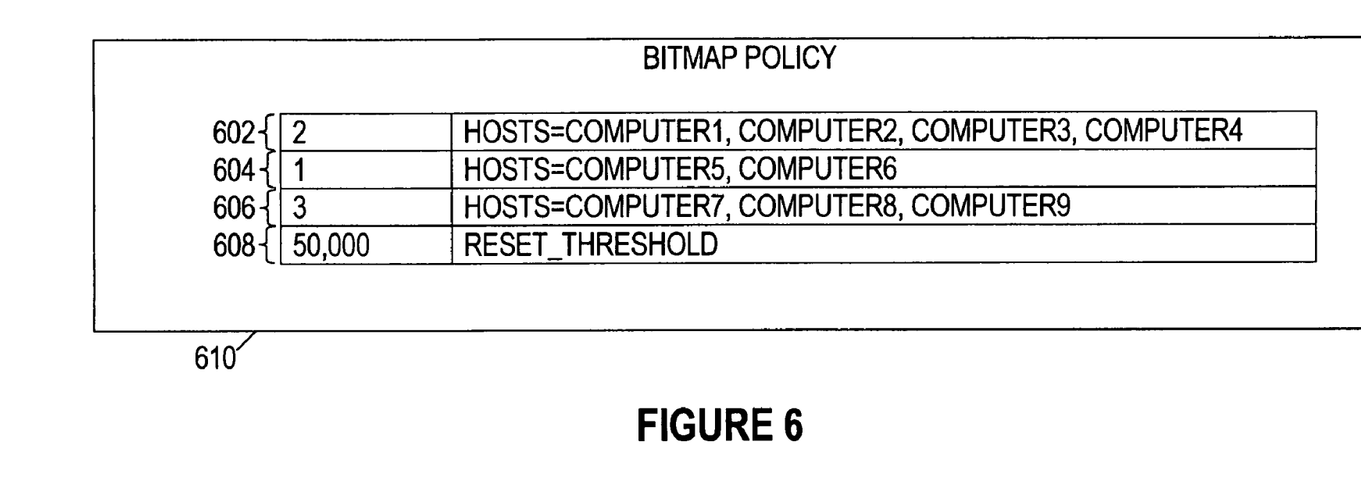
FIG. 6 shows a bitmap policy in accordance with embodiments of the invention.

In at least some embodiments of the invention, the bitmap policy comprises one or more computer files that contain one or more lists. FIG. 6 shows an exemplary bitmap policy 610 comprising four such lists 602, 604, 606, and 608. Lists 602, 604, and 606 each represent a bitmap configuration that indicates the number of bitmap sets employed for a virtual storage unit and the computers that host a master bitmap associated with each bitmap set. For example, list 602 indicates that two bitmap sets are employed for the virtual storage unit, and the two master bitmaps associated with the two bitmap sets are hosted by two computers selected from the group of computers identified by COMPUTER1, COMPUTER2, COMPUTER3, and COMPUTER4. List 604 indicates that one bitmap set is employed for the virtual storage unit, and the master bitmap associated with the bitmap set is hosted by a computer selected from the group of computers identified by COMPUTER5 and COMPUTER6. Lastly, list 606 indicates that three bitmap sets are employed, and the three master bitmaps associated with the three bitmap sets are hosted by three computers selected from the group of computers identified by COMPUTER7, COMPUTER8, and COMPUTER9. Thus, lists 602, 604, and 606 represent bitmap configurations that may be employed for a particular virtual storage unit.

A bitmap creation event triggers the creation of bitmaps in accordance with the exemplary bitmap policy 610. The creation event may represent the initialization of a virtual storage unit, a modification of the bitmap policy, a crash of one or more of the computers in the cluster, the completion of a merge operation, or any other suitable event. Each computer in the computer cluster is notified when a bitmap creation event is detected. Any suitable cluster process may perform the detection of the bitmap creation event. In response to the notification, each computer in the cluster in turn performs a bitmap creation procedure.

Figure 7:
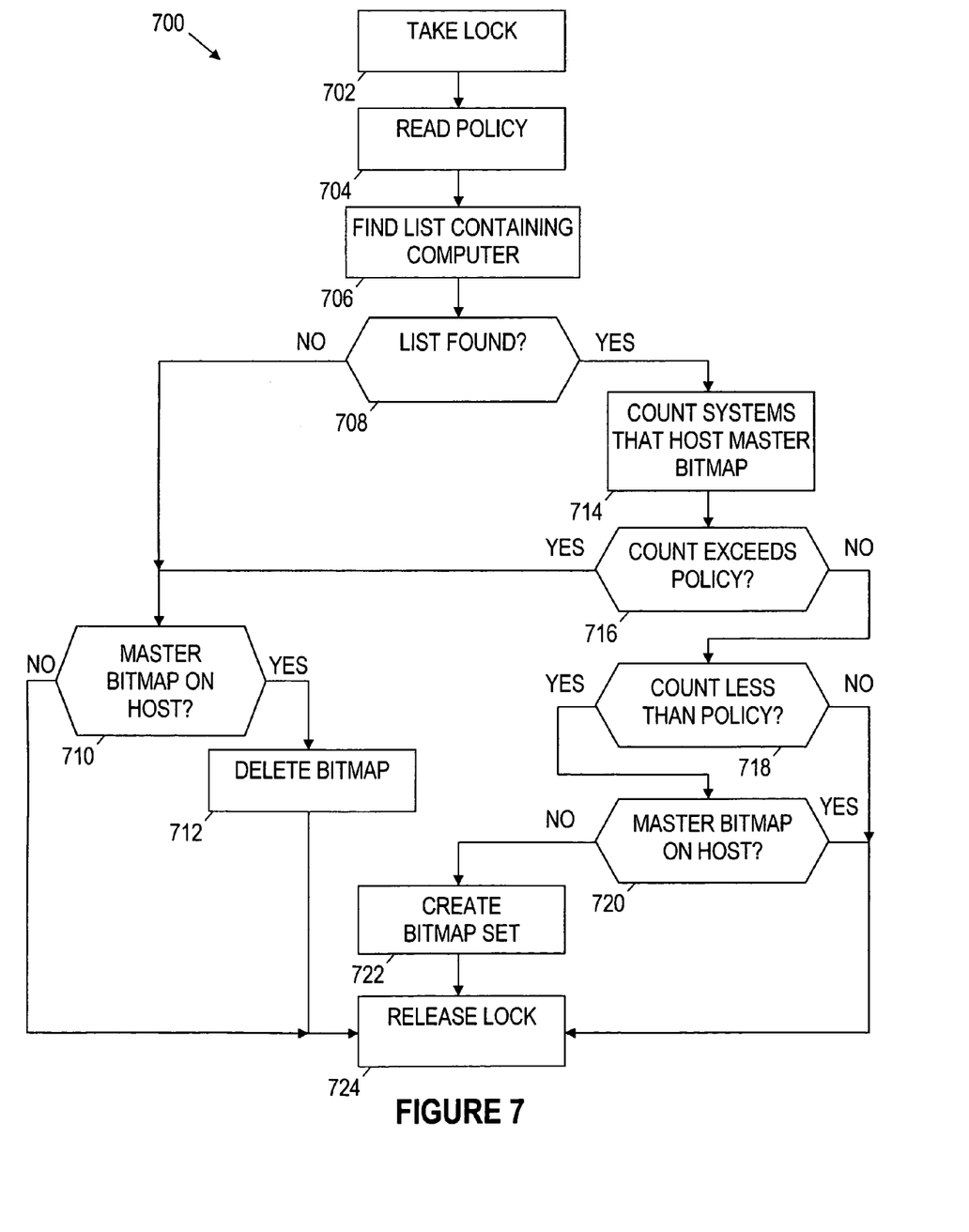
FIG. 7 shows a procedure performed by a computer cluster to create and delete a bitmap in accordance with embodiments of the invention.

FIG. 7 shows an exemplary bitmap creation procedure 700 in accordance with at least some embodiments of the invention. The computer performing the procedure 700 takes out a lock on the associated resources (block 702) and reads the bitmap policy (block 704). The resources locked comprise the bitmap policy file and/or local and master bitmaps. The bitmap policy is examined to find one or more lists in the bitmap policy that contain the computer's identification (block 706). If one or more lists are found (block 708), the computer determines the number of systems that currently host a master bitmap (block 714). If the number of systems found is less than the number indicated in the bitmap policy (block 718), and the computer is not currently hosting a master bitmap (block 720), the computer creates a new bitmap set in accordance with the bitmap policy and hosts the master bitmap associated with the bitmap set (block 722). The lock is then released (block 724). If the number of system found is not less than the number indicated in the bitmap policy (block 718), or the computer is currently hosting a master bitmap (block 720), the bitmap set is not created and the lock is released (block 724).

If the number of master bitmaps found exceeds the number indicated in the bitmap policy (block 716), or a list is not found containing the computer's identification (block 708), the computer's local memory is examined for the presence of a master bitmap (block 710). If a master bitmap is found, the master bitmap is deleted (block 712) and the lock is released (block 724). If no master bitmap is found, the lock is also released (block 724). Each computer in the computer cluster performs the bitmap creation procedure 700 under a mutual exclusion lock (blocks 702 and 724), ensuring that no two computers concurrently create or delete a bitmap set.

In addition to defining the number of bitmap sets and the one or more computers that host the master bitmap for each bitmap set, the bitmap policy 610 (FIG. 6) may also define a reset event that causes the master and local bitmaps to be reset. Resetting a bitmap refers to clearing one or more bits of the bitmap, thereby indicating that the regions represented by the cleared bits are not to be included in a merge. By resetting the bitmaps periodically according to the bitmap policy 610, the amount of data included in a merge may be reduced. By reducing the amount of data merged, the bandwidth, number of input/output (I/O) operations, and time required to perform the merge may also be reduced.

The reset event defined in the bitmap policy 610 may be any event capable of being detected by a cluster process. For example, the bitmap policy 610 may define the reset event as a predetermined number of blocks set in a master bitmap, as shown in the list 608. When the master bitmap reaches the threshold defined in the bitmap policy 610, a lock is issued on the virtual storage unit to prevent further writes from taking place. While the virtual storage unit is locked, the bitmaps are reset and the lock released, allowing write operations to be issued to the virtual storage unit.

In at least some embodiments of the invention, the bitmaps are reset in an idle period during which no writes are taking place to the virtual storage unit. Thus, after the reset event occurs, the actual resetting of the bitmaps may not take place until an idle period is detected. In addition, in other embodiments of the invention, the type of bitmap (i.e., local, master, or both) is also be defined in the bitmap policy 502 with respect to the reset event. Only the type of bitmap defined for a particular reset event is reset once the reset event occurs. In still other embodiments, a cluster process periodically probes the cluster to determine if the reset event has occurred. For example, the reset event may represent the inaccessibility of a cluster resource. A cluster process periodically (e.g., every hour) probes the resource to determine whether it is offline. If the resource is determined to be offline by the cluster process, a reset of the bitmaps occurs.

In at least some embodiments of the invention, a merge is performed after a merge event is detected. As previously discussed, a merge is performed in response to a system crash or any other suitable event creating an inconsistency between the storage devices 120 and 122. Once a merge event is detected, the status of the virtual storage unit may be changed to reflect that a merge is required. Any suitable cluster process detects the merge event and modifies the status of the virtual storage unit. For example, the status of the virtual storage unit may be stored in a memory associated with the storage controller 118 (FIG. 1). A cluster process may be responsible for detecting a merge event and modifying the status of the virtual storage unit in response to such an event.

Figure 8:
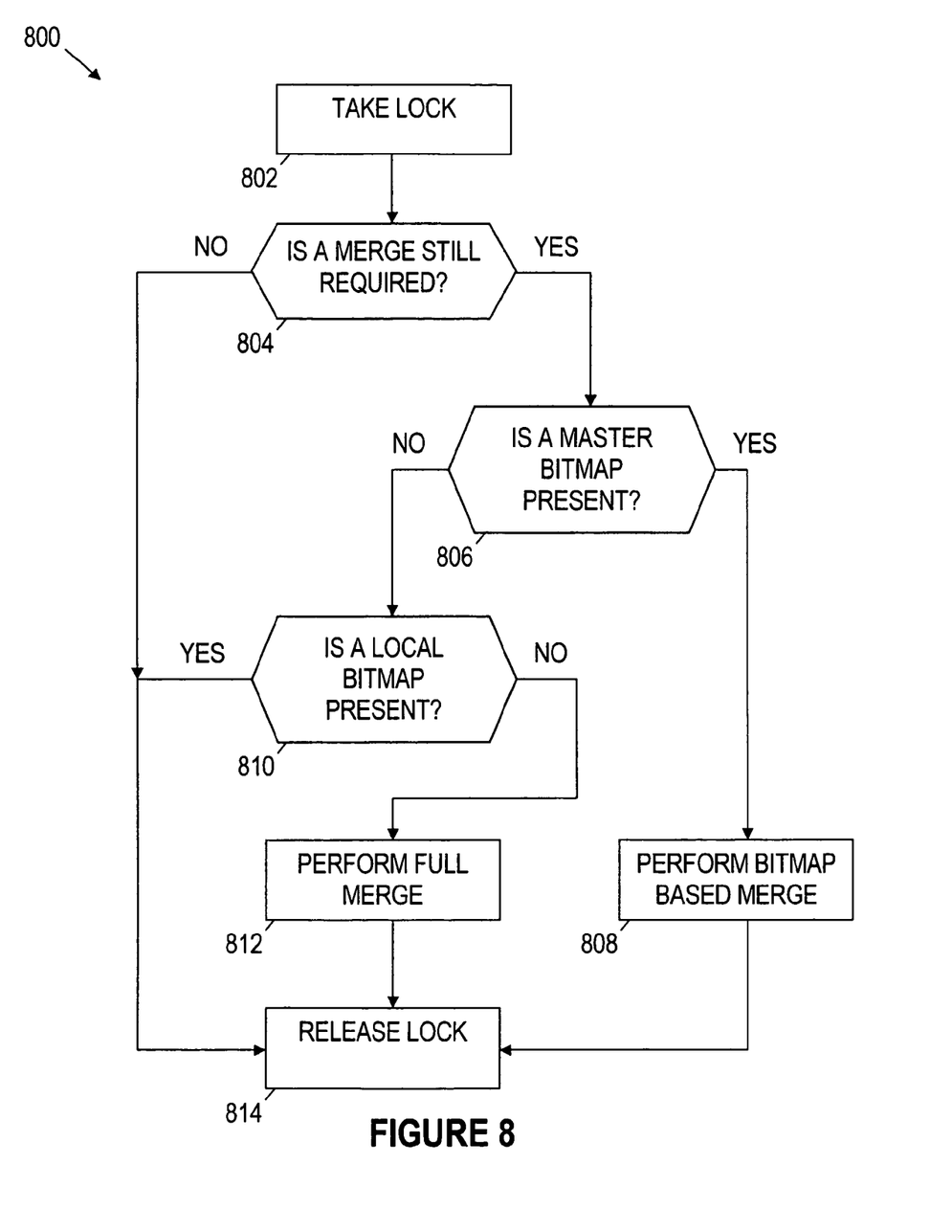
FIG. 8 shows a procedure performed by a computer cluster to perform a merge in accordance with embodiments of the invention.

FIG. 8 shows an exemplary merge procedure 800 performed by a computer in the computer cluster in accordance with at least some embodiments of the invention. The driver software of the computer performing the procedure 800 takes out a lock on the associated resources (block 802) and queries the status of the virtual storage unit to determine if a merge condition exists (block 804). The locked resources may comprise the bitmap policy file and/or the local and master bitmaps. If a merge condition does exist, the computer's local memory is examined for the presence of bitmaps. If a master bitmap is present (block 806), the driver software performs the merge operation using the master bitmap to determine which blocks of the virtual storage unit are marked as dirty and thus need to be merged (block 808). Upon successful completion of the merge, the virtual storage unit's status is updated to reflect the merge and the lock is released (block 814).

If a master bitmap is not present (block 806) and a local bitmap is present (block 810), the driver software releases the lock (block 814). If a master bitmap and local bitmap are not present (blocks 806 and 810), the driver software performs a merge of the entire virtual storage unit (block 812) and releases the lock (block 814). The driver software of each computer in the cluster performs the merge procedure 800 under a mutual exclusion lock (blocks 802 and 814), ensuring that the two computers do not perform the merge procedure 800 concurrently.

The above discussion is meant to be illustrative of the principles and various embodiments of the present invention. Numerous variations and modifications will become apparent to those skilled in the art once the above disclosure is fully appreciated. For example, a plurality of virtual storage units may be coupled to a single computer cluster. Each virtual storage unit may be associated with one or more bitmap sets. It is intended that the following claims be interpreted to embrace all such variations and modifications.

What is claimed is:

1. A system, comprising:
   a plurality of computers coupled together, each computer comprising a local volatile memory;
   an array of redundant storage devices accessible to the plurality of computers; and
   at least one bitmap set that includes a master bitmap and at least one local bitmap;
   wherein the at least one local bitmap is stored in the local volatile memory of one of the plurality of computers to log modifications made to the array only by the particular computer of the plurality of computers where the local bitmap is stored;
   wherein the master bitmap logs modifications made by each of the plurality of computers to the array of redundant storage devices, said modifications logged in the master bitmap identifying regions of storage in the storage devices that have been modified; and
   wherein at least one of the computers stores a bitmap policy that specifies a plurality of bitmap sets and, for each bitmap set, identifies one or more computers that is to host a master bitmap.

2. The system of claim 1 further comprising a plurality of bitmap sets, each bitmap set containing a master bitmap and at least one local bitmap.

3. The system of claim 1 wherein the plurality of computers comprises a cluster configured to exchange messages among the plurality of computers.

4. The system of claim 1 wherein the plurality of computers comprises a cluster configured to lock resources shared among the plurality of computers.

5. The system of claim 1 wherein the array of redundant storage devices comprises a redundant array of inexpensive disks (RAID).

6. The system of claim 1 wherein the bitmap policy defines a reset event for clearing at least one bit of the at least one bitmap, thereby indicating that a region represented by the cleared bit is not included in a merge.

7. The system of claim 1 wherein the local memory is selected from the group consisting of random access memory (RAM), synchronous dynamic random access memory (SDRAM), and rambus dynamic random access memory (RDRAM).

8. A method, comprising:
   in a bitmap policy, defining a reset event that causes a bitmap set to be reset; wherein the bitmap set relates to an array of storage devices accessible to a plurality of computers; and
   clearing at least one bit of the bitmap set in response to the reset event, thereby indicating that a region represented by the cleared bit is not to be included in a subsequent merge;
   wherein the bitmap set comprises a master bitmap that identifies regions of storage in an array that have been modified by the plurality of computers and at least one local bitmap that logs modifications made to the array only by a particular computer of the plurality of computers in whose volatile memory the local bitmap is stored; and
   wherein the bitmap policy identifies one or more of the computers to host the master bitmap set.

9. The method of claim 8, further comprising merging contents of the storage devices.

10. The method of claim 9, wherein merging contents of the storage devices further comprises comparing the contents of the storage devices.

11. The method of claim 8 further comprising clearing at least one bit of the bitmap set after merging contents of the storage devices.

12. The method of claim 8 further comprising sending messages between computers of the computer cluster to indicate a modification of the redundant array of storage devices.

13. The method of claim 9, wherein merging contents of the storage devices further comprises determining when the bitmap is a master bitmap that represents modifications made to the redundant storage devices by the computer cluster.

14. The method of claim 9, wherein merging contents of the storage devices further comprises determining when the bitmap is a local bitmap that represents modifications made to the redundant storage devices by a computer of the computer cluster.

15. A method, comprising:
when a master bitmap is present among a bitmap set hosted by a plurality of hosts:
selecting the host of the master bitmap from the plurality of hosts based on the presence of the master bitmap;
associating the master bitmap with an array of redundant storage devices by examining a bitmap policy that specifies a plurality of bitmap sets and, for each bitmap set, identifies one or more hosts that is to host a master bitmap associated with each such bitmap set; and
performing a bitmap based merge of the contents of the storage devices identified in the master bitmap to maintain consistency of data in the storage devices; and
when a master bitmap is not present and a local bitmap is not present, performing a full merge of the contents of the storage devices.

16. The method of claim 15 wherein the master bitmap comprises a log of modifications to an array made by each computer of the plurality of computers and the local bitmap comprises a log of modifications made to the array by the particular computer of the plurality of computers where the local bitmap is stored.

17. The method of claim 15, further comprising:
taking a lock such that the host of the master bitmap exclusively performs the bitmap based merge of the contents of the storage devices when a master bitmap is present; and
releasing the lock when a local bitmap is present.

18. The method of claim 15 further comprising determining whether the master bitmap is consistent with the bitmap policy, and deleting the bitmap when the bitmap is not consistent.

19. A system, comprising:
means for creating a bitmap set comprising a master bitmap that identifies regions of an array of redundant storage devices that have been modified by a computer cluster and at least one local bitmap that logs regions of the array that have been modified only by the one computer in the computer cluster where the local bitmap is stored, said means for creating creates the bitmap set based on a bitmap policy that specifies a plurality of bitmap sets and, for each bitmap set, identifies one or more computers in the computer cluster that is to host the master bitmap associated with each such bitmap set;
means for storing the master bitmap;
means for storing the at least one local bitmap in local volatile memory of one computer in the computer cluster;
means for performing a bitmap based merge of the contents of the storage devices at a location determined from the master bitmap when the master bitmap is present; and
means for performing a full merge of the contents of the storage devices when no master bitmap is present and no local bitmap is present.

20. The system of claim 19 further comprising a means for clearing at least one bit of the bitmap in response to a predetermined event.

21. The system of claim 19 further comprising a means for exchanging messages that indicate regions of the array that have been modified.

* * * * *